(12) United States Patent
Reingowsky

(10) Patent No.: US 10,026,342 B2
(45) Date of Patent: Jul. 17, 2018

(54) IMPACT PROTECTION DEVICE

(71) Applicant: Philip Reingowsky, Davie, FL (US)

(72) Inventor: Philip Reingowsky, Davie, FL (US)

( * ) Notice: Subject to any disclaimer, the term of this patent is extended or adjusted under 35 U.S.C. 154(b) by 0 days.

(21) Appl. No.: 15/295,623

(22) Filed: Oct. 17, 2016

(65) Prior Publication Data

US 2018/0108280 A1 Apr. 19, 2018

(51) Int. Cl.
| | | |
|---|---|---|
| *B60R 19/42* | (2006.01) | |
| *B60R 19/38* | (2006.01) | |
| *G09F 7/18* | (2006.01) | |
| *G09F 7/10* | (2006.01) | |
| *B60D 1/60* | (2006.01) | |
| *G09F 13/22* | (2006.01) | |

(52) U.S. Cl.
CPC ............... *G09F 7/18* (2013.01); *G09F 13/22* (2013.01); *B60R 19/38* (2013.01); *G09F 2007/1843* (2013.01); *G09F 2007/1865* (2013.01); *G09F 2013/222* (2013.01)

(58) Field of Classification Search
CPC ...... G09F 5/18; G09F 13/22; G09F 2013/222; G09F 2007/1843; G09F 2007/1865; G09F 7/18; B60R 19/38
USPC .......................................................... 293/118
See application file for complete search history.

(56) References Cited

U.S. PATENT DOCUMENTS

| | | | |
|---|---|---|---|
| 4,008,915 A | 2/1977 | Walker | |
| 4,430,638 A | 2/1984 | Parker | |
| 5,199,755 A | 4/1993 | Gertz | |
| 5,248,129 A | 9/1993 | Gertz | |
| 5,947,452 A | 9/1999 | Albritton | |
| 6,036,249 A | 3/2000 | Kuntz | |
| 6,183,042 B1 * | 2/2001 | Unrath | E01F 9/662 293/118 |
| 7,341,397 B2 * | 3/2008 | Murphy | B62D 21/20 188/377 |
| 7,708,324 B2 | 5/2010 | Murray et al. | |

FOREIGN PATENT DOCUMENTS

WO    WO2015038395    3/2015

* cited by examiner

*Primary Examiner* — Joseph D. Pape
*Assistant Examiner* — Dana D Ivey

(57) ABSTRACT

An impact protection device for law enforcement and emergency vehicles includes a pair of bars. The bars are configured to couple to an undercarriage of a vehicle and extend in parallel such that endpoints of the bars are positioned proximate to opposing ends of a bumper of the vehicle. A plate is coupled to and extends between the endpoints. Each of a pair of shock absorbers is coupled to and extends linearly from a respective endpoint. A frame is coupled to and extends between the shock absorbers distal from the endpoints. A plurality of signs is coupled to the frame. The signs are configured to notify drivers proximate to the vehicle. The frame is configured to transfer a force from an impact to the frame through the shock absorbers to the plate. The plate is configured to substantially evenly transfer a reduced force from the impact to the bumper.

12 Claims, 5 Drawing Sheets

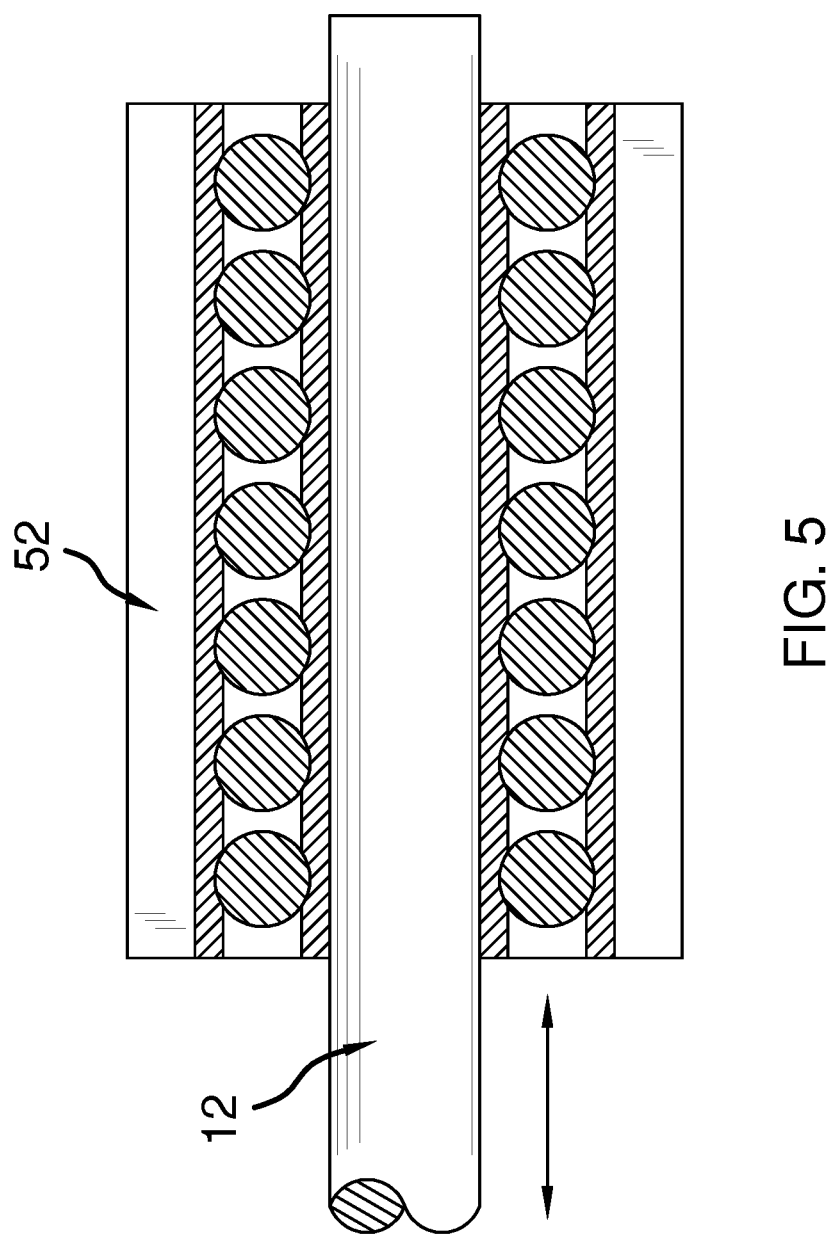

IMPACT PROTECTION DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to impact protection devices and more particularly pertains to a new impact protection device for law enforcement and emergency vehicles.

BRIEF SUMMARY OF THE INVENTION

An embodiment of the disclosure meets the needs presented above by generally comprising a pair of bars. The bars are configured to couple to an undercarriage of a vehicle and extend in parallel such that endpoints of the bars are positioned proximate to opposing ends of a bumper of the vehicle. A plate is coupled to and extends between the endpoints. Each of a pair of shock absorbers is coupled to and extends linearly from a respective endpoint. A frame is coupled to and extends between the shock absorbers distal from the endpoints. A plurality of signs is coupled to the frame. The signs are configured to notify drivers proximate to the vehicle. The frame is configured to transfer a force from an impact to the frame through the shock absorbers to the plate. The plate is configured to substantially evenly transfer a reduced force from the impact to the bumper.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is a detail view of an embodiment of the disclosure.

DETAILED DESCRIPTION OF THE INVENTION

Figure 1:
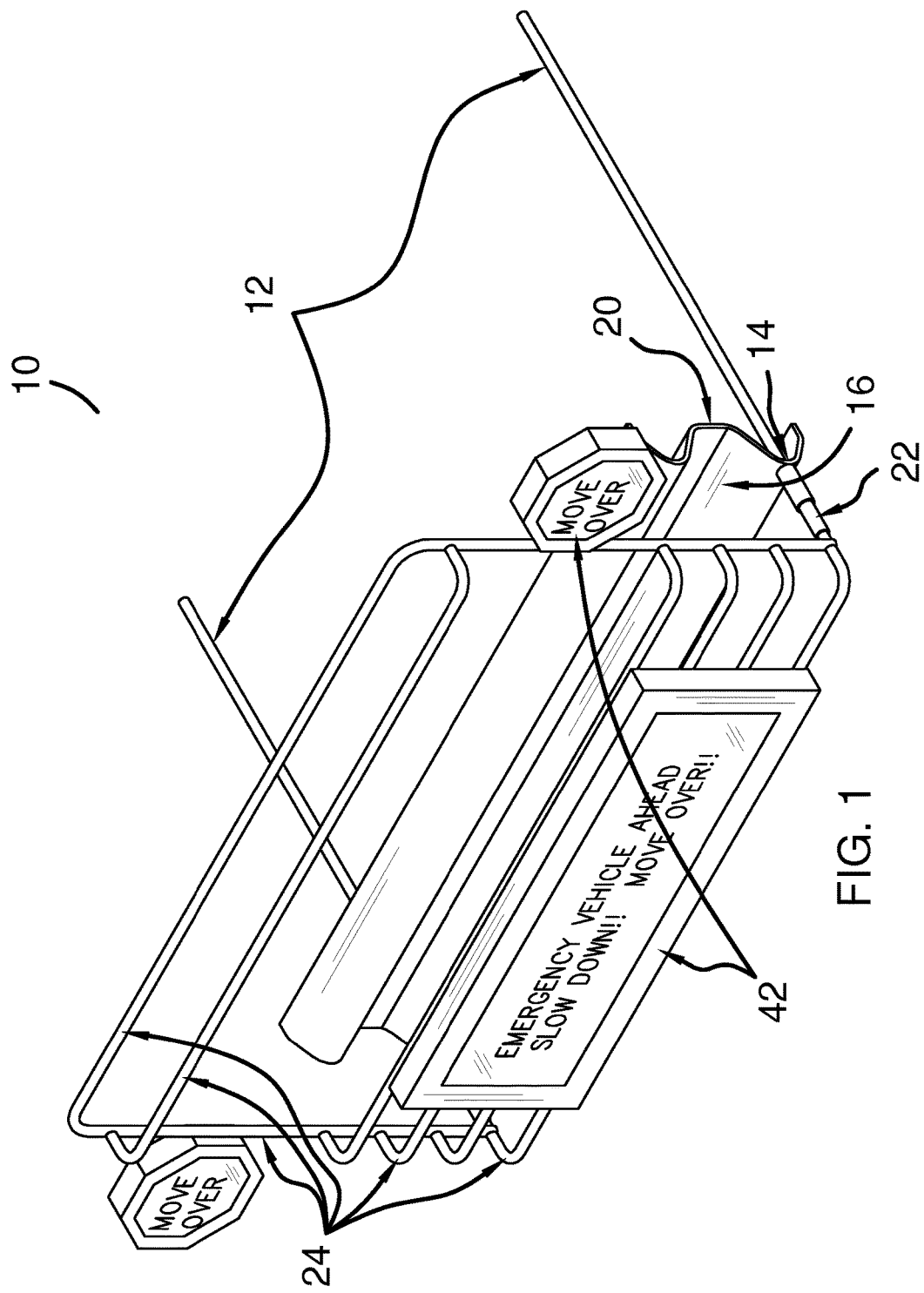
FIG. 1 is an isometric perspective view of an impact protection device according to an embodiment of the disclosure.
Figure 2:
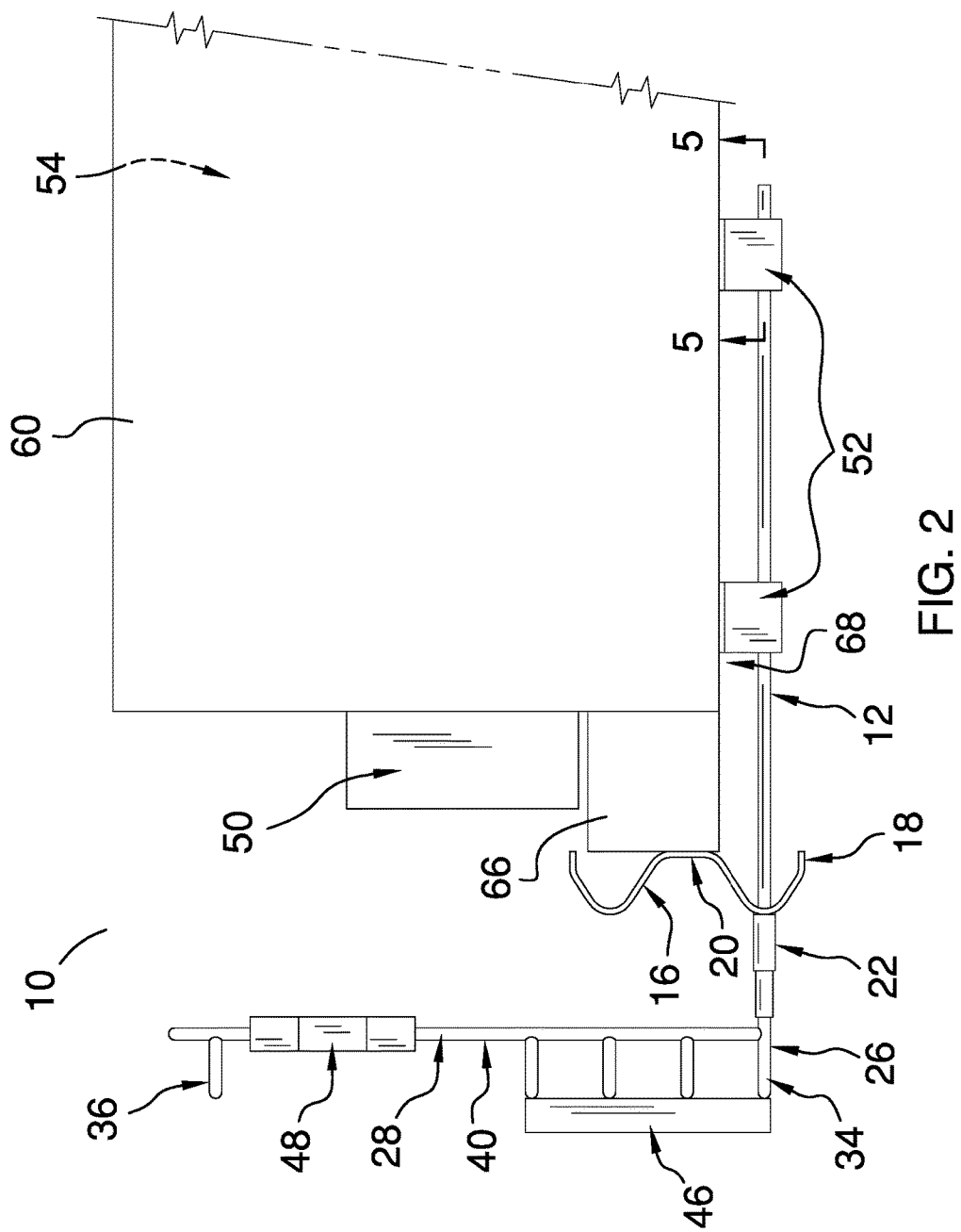
FIG. 2 is a side view of an embodiment of the disclosure.
Figure 3:
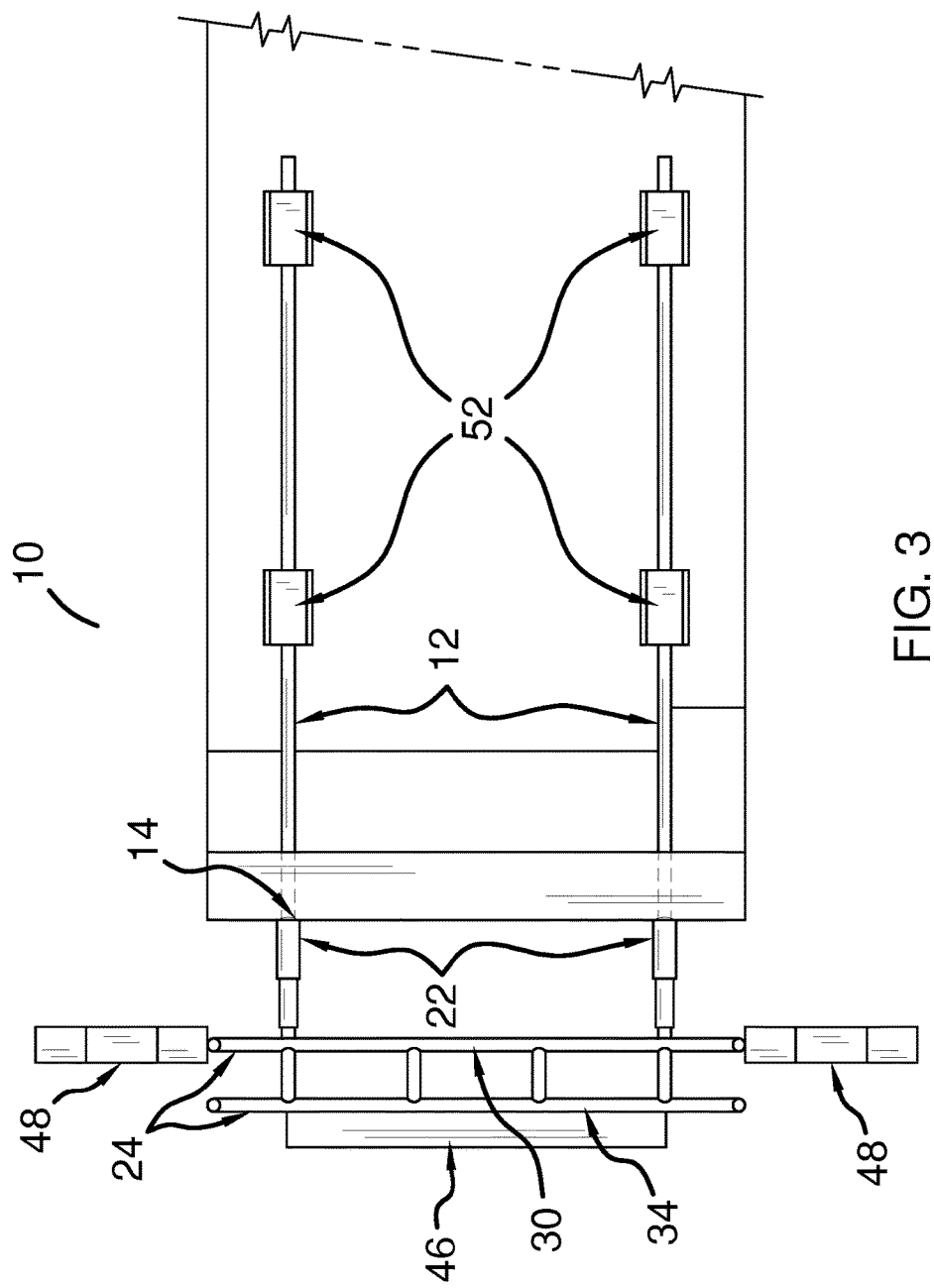
FIG. 3 is a bottom view of an embodiment of the disclosure.
Figure 4:
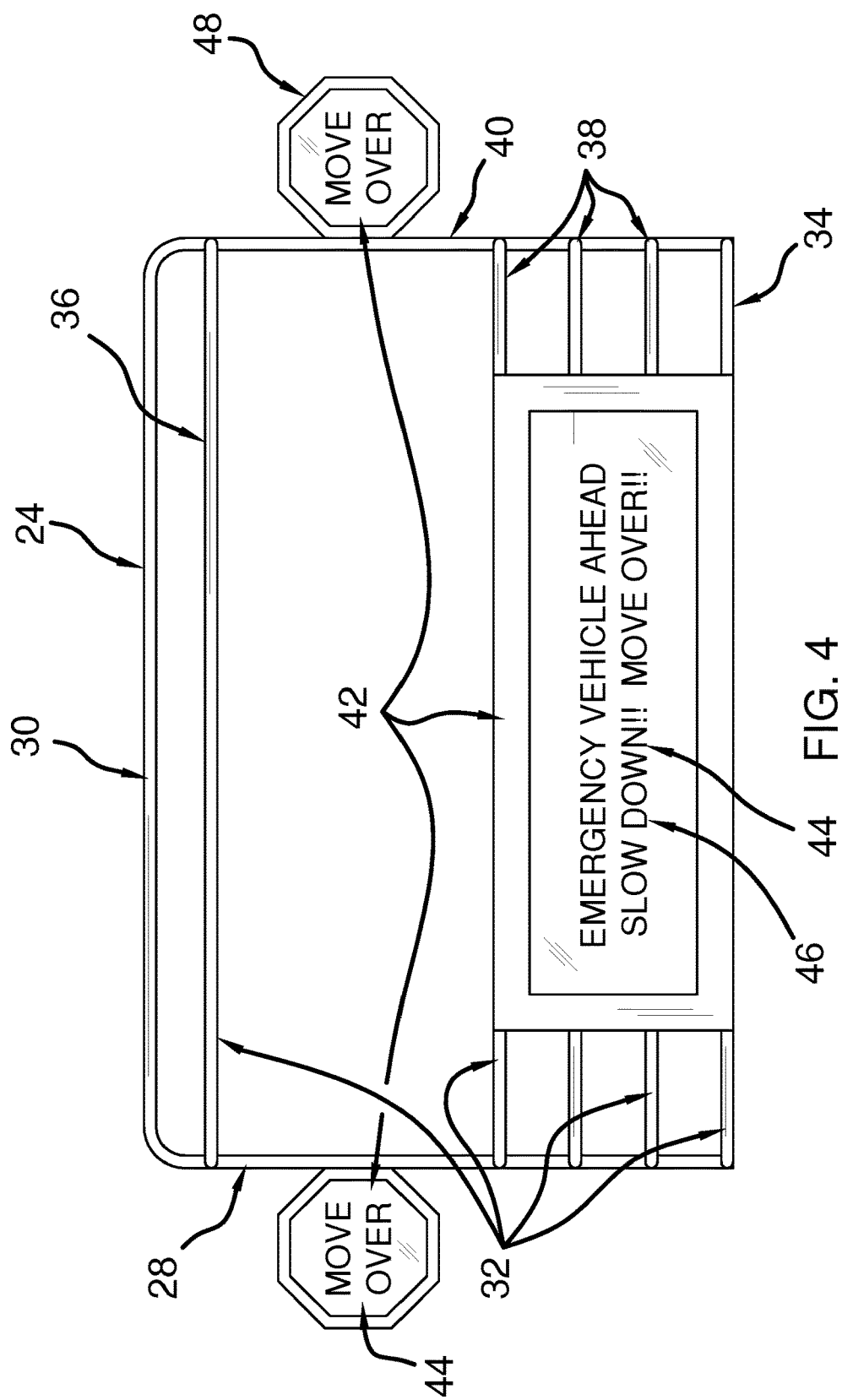
FIG. 4 is an end view of an embodiment of the disclosure.

With reference now to the drawings, and in particular to FIGS. 1 through 5 thereof, a new impact protection device embodying the principles and concepts of an embodiment of the disclosure and generally designated by the reference numeral 10 will be described.

As best illustrated in FIGS. 1 through 5, the impact protection device 10 generally comprises a pair of bars 12. Each bar 12 is configured to couple to an undercarriage 68 of a vehicle 60. The bars 12 extend in parallel from the undercarriage 68 such that endpoints 14 of the bars 12 are positioned proximate to opposing ends of a bumper 66 of the vehicle 60. In one embodiment, the bars 12 are circularly shaped when viewed longitudinally.

A plate 16 is coupled to and extends between the endpoints 14. The plate 16 is substantially perpendicular to the bars 12. The bars 12 are positioned proximate to a lower edge 18 of the plate 16. In one embodiment, the plate 16 is curvedly W-shaped such that a midline 20 of the plate 16 is substantially aligned with the bumper 66 of the vehicle 60.

Each of a pair of shock absorbers 22 is coupled to and extends linearly from a respective endpoint 14. A frame 24 is coupled to and extends between the shock absorbers 22 distal from the endpoints 14. The frame 24 is positioned on the shock absorbers 22 such that the frame 24 is configured to transfer a force from an impact to the frame 24 through the shock absorbers 22 to the plate 16. The plate 16 is configured to substantially evenly transfer a reduced force from the impact to the bumper 66. In one embodiment, the frame 24 is substantially perpendicular to the shock absorbers 22, such that the frame 24 and the plate 16 are substantially parallel planarly positioned. In another embodiment, the shock absorbers 22 are positioned proximate to a bottom edge 26 of the frame 24.

The frame 24 comprises a pair of side arms 28, a top arm 30 and a plurality of cross arms 32. Each side arm 28 is coupled to and extends perpendicularly from a respective shock absorber 22. The top arm 30 is coupled to and extends between the side arms 28 distal from the shock absorbers 22. The plurality of cross arms 32 is coupled to and extends between the side arms 28. In one embodiment, each cross arm 32 is curved proximate to the side arms 28, such that the cross arms 32 protrude from the frame 24 transversely from the shock absorbers 22. In another embodiment, the plurality of cross arms 32 comprises a bottom crossbar 34, a top crossbar 36 and a set of three lower crossbars 38. The bottom crossbar 34 defines the bottom edge 26 of the frame 24. The top crossbar 36 is positioned proximate to the top arm 30. The set of three lower crossbars 38 is substantially evenly spaced between the bottom crossbar 34 and midpoints 40 of the side arms 28.

A plurality of signs 42 is coupled to the frame 24. The signs 42 are configured to notify drivers proximate to the vehicle 60. In one embodiment, the signs 42 are selectively programmable. In another embodiment, the signs 42 comprise light emitting diodes 44. In yet another embodiment, the plurality of signs 42 comprises a first signal 46 and a pair of second signals 48. The first signal 46 is positioned adjacent to the bottom crossbar 34 and the lower crossbars 38. The first signal 46 is substantially rectangularly shaped. The pair of second signals 48 is coupled singly to and extends from the side arms 28. The second signals 48 are octagonally shaped.

In one embodiment, an actuator 50 is configured to position in a trunk of the vehicle 60. The actuator 50 is configured to couple to the vehicle 60. In another embodiment, the actuator 50 is hydraulic. The device 10 comprises a plurality of linear roller bearings 52 that is couplable to the vehicle 60. The linear roller bearings 52 are operationally coupled to the actuator 50. Respective linear roller bearings 52 are positioned for operational coupling to the bars 12. The linear roller bearings 52 are positioned on the bars 12 such that the actuator 50 is positioned to motivate the bars 12 from a retracted position to an extended position, wherein the frame 24 is motivated distally from the vehicle 60. The linear roller bearings 52 also are positioned to motivate the actuator 50 to resist repositioning of the bars 12 to the retracted position coincident with an impact to the frame 24. The linear roller bearings 52 also are positioned to motivate linear repositioning of the bars 12, such that the plate 16 substantially evenly impacts the bumper 66 of the vehicle 60 upon the impact to the frame 24. In another embodiment, the plurality of linear roller bearings 52 comprises four linear roller bearings 52 that are distributed evenly between the pair of bars 12.

A controller 54 is configured to position proximate to a driver of the vehicle 60. The controller 54 is configured to couple to the vehicle 60. The controller 54 is operationally coupled to the actuator 50. The controller 54 is coupled to the actuator 50 such that the controller 54 is positioned to motivate the actuator 50 to motivate the bars 12 selectively between the retracted position and the extended position.

In use, the linear roller bearings 52 are positioned on the bars 12 such that the actuator 50 is positioned to motivate the bars 12 from a retracted position to an extended position, wherein the frame 24 is motivated distally from the vehicle 60. The linear roller bearings 52 are positioned to motivate the actuator 50 to resist repositioning of the bars 12 to the retracted position coincident with an impact to the frame 24. The linear roller bearings 52 are positioned to motivate linear repositioning of the bars 12, such that the plate 16 substantially evenly impacts the bumper 66 of the vehicle 60 upon the impact to the frame 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An impact protection device comprising:
   a pair of bars, each said bar being configured for coupling to an undercarriage of a vehicle, wherein said bars extend in parallel from the undercarriage such that endpoints of said bars are positioned proximate to opposing ends of a bumper of the vehicle;
   a plate coupled to and extending between said endpoints, said plate being substantially perpendicular to said bars, said bars being positioned proximate to a lower edge of said plate, said plate being curvedly W-shaped such that a midline of said plate is substantially aligned with the bumper of the vehicle;
   a pair of shock absorbers, each said shock absorber being coupled to and extending linearly from a respective said endpoint;
   a frame coupled to and extending between said shock absorbers distal from said endpoints;
   a plurality of signs coupled to said frame, said signs being configured for notifying drivers proximate to the vehicle; and
   wherein said frame is positioned on said shock absorbers such that said frame is configured to transfer a force from an impact to said frame through said shock absorbers to said plate, wherein said plate is configured to substantially evenly transfer a reduced force from the impact to the bumper.

2. The device of claim 1, further including said frame being substantially perpendicular to said shock absorbers such that said frame and said plate are substantially parallel planarly positioned.

3. The device of claim 2, further including said shock absorbers being positioned proximate to a bottom edge of said frame.

4. The device of claim 3, further including said frame comprising:
   a pair of side arms coupled to and extending perpendicularly from said shock absorbers;
   a top arm coupled to and extending between said side arms distal from said shock absorbers; and
   a plurality of cross arms coupled to and extending between said side arms, each said cross arm being curved proximate to said side arms such that said cross arms protrude from said frame transversely from said shock absorbers.

5. The device of claim 4, further including said plurality of cross arms comprising:
   a bottom crossbar defining said bottom edge of said frame;
   a top crossbar positioned proximate to said top arm; and a set of three lower crossbars substantially evenly spaced between said bottom crossbar and midpoints of said side arms.

6. The device of claim 5, further including said plurality of signs comprising:
a first signal positioned adjacent to said bottom crossbar and said lower crossbars, said first signal being substantially rectangularly shaped; and
a pair of second signals coupled to and extending from said side arms, said second signals being octagonally shaped.

7. The device of claim 1, further including said signs being selectively programmable.

8. The device of claim 1, further including said signs comprising light emitting diodes.

9. An impact protection device comprising:
a pair of bars, each said bar being configured for coupling to an undercarriage of a vehicle, wherein said bars extend in parallel from the undercarriage such that endpoints of said bars are positioned proximate to opposing ends of a bumper of the vehicle;
a plate coupled to and extending between said endpoints;
a pair of shock absorbers, each said shock absorber being coupled to and extending linearly from a respective said endpoint;
a frame coupled to and extending between said shock absorbers distal from said endpoints;
a plurality of signs coupled to said frame, said signs being configured for notifying drivers proximate to the vehicle;
wherein said frame is positioned on said shock absorbers such that said frame is configured to transfer a force from an impact to said frame through said shock absorbers to said plate, wherein said plate is configured to substantially evenly transfer a reduced force from the impact to the bumper;
said bars being circularly shaped when viewed longitudinally;
an actuator configured for positioning in a trunk of the vehicle, said actuator being configured for coupling to the vehicle, said actuator being hydraulic;
a plurality of linear roller bearings couplable to the vehicle, said linear roller bearings being operationally coupled to said actuator, respective said linear roller bearings being positioned for operational coupling to said bars; and
wherein said linear roller bearings are positioned on said bars such that said actuator is positioned to motivate said bars from a retracted position to an extended position such that said frame is motivated distally from the vehicle, wherein said linear roller bearings are positioned to motivate said actuator to resist repositioning of said bars to the retracted position coincident with an impact to said frame, and wherein linear roller bearings are positioned to motivate linear repositioning of said bars such that said plate substantially evenly impacts the bumper of the vehicle upon the impact to said frame.

10. The device of claim 9, further including said plurality of linear roller bearings comprising four said linear roller bearings distributed evenly between said pair of bars.

11. The device of claim 9, further including a controller configured for positioning proximate to a driver of the vehicle, said controller being configured for coupling to the vehicle, said controller being operationally coupled to said actuator, wherein said controller is coupled to said actuator such that said controller is positioned to motivate said actuator to motivate said bars selectively between the retracted position and the extended position.

12. An impact protection device comprising:
a pair of bars, each said bar being configured for coupling to an undercarriage of a vehicle, wherein said bars extend in parallel from the undercarriage such that endpoints of said bars are positioned proximate to opposing ends of a bumper of the vehicle, said bars being circularly shaped when viewed longitudinally;
a plate coupled to and extending between said endpoints, said plate being substantially perpendicular to said bars, said bars being positioned proximate to a lower edge of said plate, said plate being curvedly W-shaped such that a midline of said plate is substantially aligned with the bumper of the vehicle;
a pair of shock absorbers, each said shock absorber being coupled to and extending linearly from a respective said endpoint;
a frame coupled to and extending between said shock absorbers distal from said endpoints, wherein said frame is positioned on said shock absorbers such that said frame is configured to transfer a force from an impact to said frame through said shock absorbers to said plate, wherein said plate is configured to substantially evenly transfer a reduced force from the impact to the bumper, said frame being substantially perpendicular to said shock absorbers such that said frame and said plate are substantially parallel planarly positioned, said shock absorbers being positioned proximate to a bottom edge of said frame, said frame comprising:
a pair of side arms coupled to and extending perpendicularly from said shock absorbers,
a top arm coupled to and extending between said side arms distal from said shock absorbers, and
a plurality of cross arms coupled to and extending between said side arms, each said cross arm being curved proximate to said side arms such that said cross arms protrude from said frame transversely from said shock absorbers, said plurality of cross arms comprising:
a bottom crossbar defining said bottom edge of said frame, a top crossbar positioned proximate to said top arm, and a set of three lower crossbars substantially evenly spaced between said bottom crossbar and midpoints of said side arms;
a plurality of signs coupled to said frame, said signs being configured for notifying drivers proximate to the vehicle, said signs being selectively programmable, said signs comprising light emitting diodes, said plurality of signs comprising:
a first signal positioned adjacent to said bottom crossbar and said lower crossbars, said first signal being substantially rectangularly shaped, and
a pair of second signals coupled to and extending from said side arms, said second signals being octagonally shaped;
an actuator configured for positioning in a trunk of the vehicle, said actuator being configured for coupling to the vehicle, said actuator being hydraulic;
a plurality of linear roller bearings couplable to the vehicle, said linear roller bearings being operationally coupled to said actuator, respective said linear roller bearings being positioned for operational coupling to said bars, wherein said linear roller bearings are positioned on said bars such that said actuator is positioned to motivate said bars from a retracted position to an extended position such that said frame is motivated distally from the vehicle, wherein said linear roller bearings are positioned to motivate said actuator to resist repositioning of said bars to the retracted position coincident with an impact to said frame, and wherein linear roller bearings are positioned to motivate linear repositioning of said bars such that said plate substantially evenly impacts the bumper of the vehicle upon the impact to said frame, said plurality of linear roller bearings comprising four said linear roller bearings distributed evenly between said pair of bars;

a controller configured for positioning proximate to a driver of the vehicle, said controller being configured for coupling to the vehicle, said controller being operationally coupled to said actuator, wherein said controller is coupled to said actuator such that said controller is positioned to motivate said actuator to motivate said bars selectively between the retracted position and the extended position; and wherein said linear roller bearings are positioned on said bars such that said actuator is positioned to motivate said bars from a retracted position to an extended position such that said frame is motivated distally from the vehicle, wherein said linear roller bearings are positioned to motivate said actuator to resist repositioning of said bars to the retracted position coincident with an impact to said frame, and wherein linear roller bearings are positioned to motivate linear repositioning of said bars such that said plate substantially evenly impacts the bumper of the vehicle upon the impact to said frame.

* * * * *